United States Patent

Lorange

[15] 3,678,203

[45] July 18, 1972

[54] COIN OPERATED TELEPHONE NETWORK ALLOWING LIMITED FREE CALLS

[72] Inventor: Jean G. Lorange, Greenfield Park, Canada

[73] Assignee: The Bell Telephone Company of Canada, Montreal, Quebec, Canada

[22] Filed: Feb. 24, 1971

[21] Appl. No.: 118,385

[52] U.S. Cl. ....................179/6.3 R

[51] Int. Cl. ....................H04m 17/02

[58] Field of Search ....................179/6.3 R, 17 C, 90 D

[56] References Cited

UNITED STATES PATENTS

| | | | |
|---|---|---|---|
| 3,601,541 | 8/1971 | Thompson | 179/6.3 R |
| 3,406,256 | 10/1868 | Strommen | 179/6.3 R |
| 2,886,641 | 5/1959 | Lomax | 179/6.3 R |

*Primary Examiner*—Kathleen H. Claffy
*Assistant Examiner*—Horst F. Brauner
*Attorney*—Westell & Hanley

[57] ABSTRACT

Free calling from a coin operated subset is provided by the circuitry which allows contingent counting of dialled digits up to a certain number and if said counting is completed preventing the dialling of further digits. If a coin has been deposited the completion of the counting is prevented and optional completion of the counting is prevented on the dialling of certain digits indicative of otherwise free calls such as service calls.

14 Claims, 3 Drawing Figures

Patented July 18, 1972 3,678,203

2 Sheets-Sheet 2

COIN OPERATED TELEPHONE NETWORK ALLOWING LIMITED FREE CALLS

Figure 1:
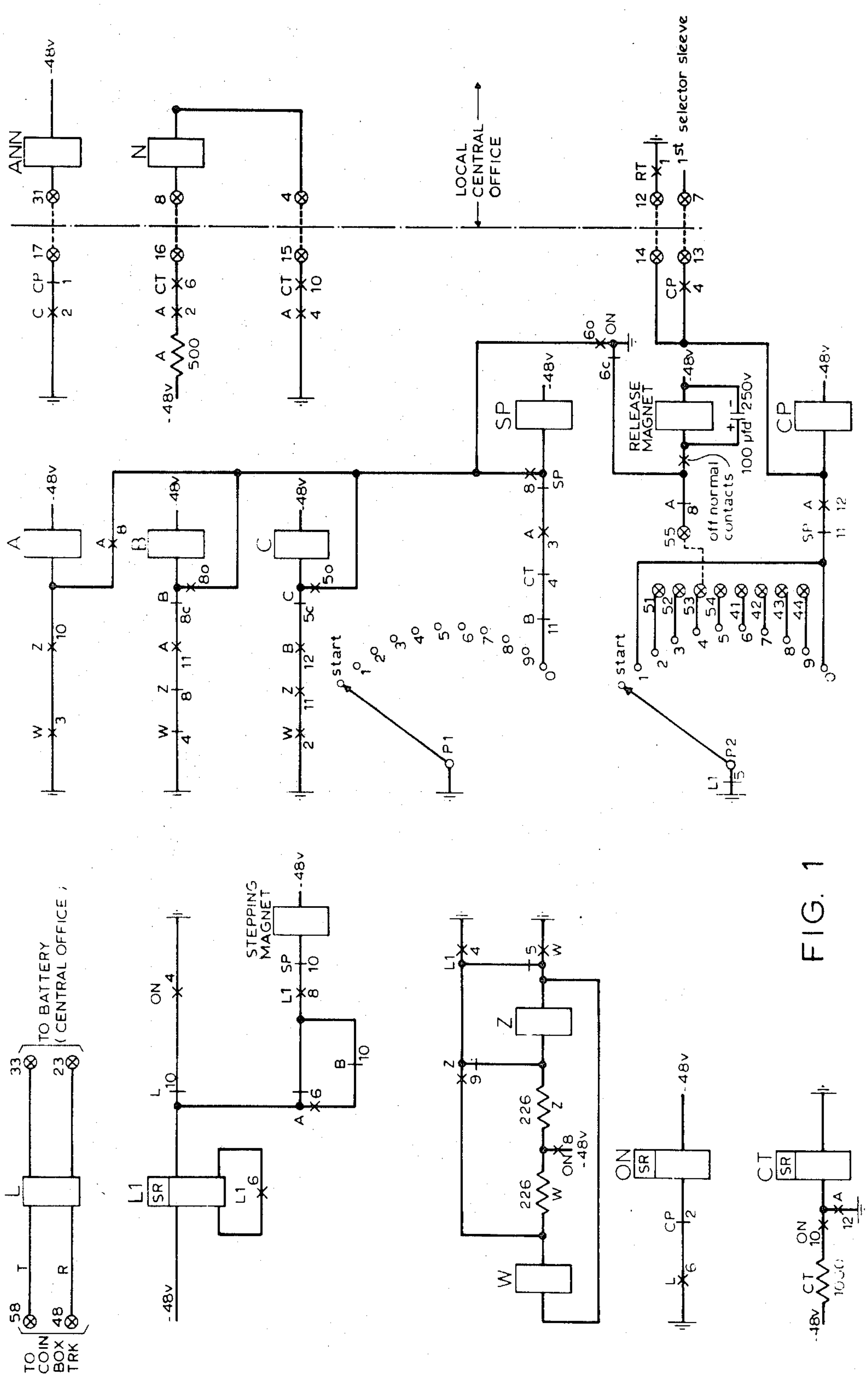

This invention relates to circuitry designed for use in combination with a coin operated telephone subset and a central office trunk connected for use by said subset.

Prior coin operated subsets have mainly been designed so that no call could be initiated prior to the deposit of a coin, even in the situation where a free call was legitimate (where the coin was later returned), such as a service call, information call, operator call, collect long distance call. This arrangement was inconvenient since a potential caller wishing to make a free call was unable to do so without the required coin and secondly, expensive additional equipment was required to return the coin to the caller.

Prior coin operated subsets have also been designed to allow the dialling of a predetermined number of digits in the absence of a coin. Such systems have been designed to allow the dialling of such a predetermined number (say three) digits, have then checked for a coin, and then allowed or prevented the transmission of further digits depending on the presence or absence of a coin. Such a system had the disadvantage that the counter was fully employed on every call, and the counter tended to wear out and malfunction under such wear. Moreover such prior devices are designed for attachment to the coin box end of the trunk rather than to the central office end thereof. Such an arrangement causes multiplication of equipment and expense to a degree which exceeds the relative cost if the equipment were provided at the central office end.

The invention provides circuitry designed for location at the central office end of a coin box trunk (i.e. in physical proximity to the central office) which allows a predetermined number of dialled digits to be transmitted along the coin box trunk without coin deposit.

Means are provided for counting the digits transmitted up to a predetermined number, and for preventing transmission of further digits when said means have counted said number of digits. Under conditions, which will be outlined, the counting is terminated before the predetermined number is counted, hence the transmission of digits above such predetermined number is not terminated or prevented. The predetermined number is less than the number required to place a call, local with respect to the coin box, since these calls will require insertion of a coin. The predetermined number for a circuit using all the advantageous features of a design will be at least two. The circuit is designed to respond to a check made for the presence of a coin before the predetermined number of digits are transmitted and, responsive to coin presence, to discontinue the counting so that digital transmission may continue above and beyond the predetermined number.

Preferred inventive features may optionally be combined with the circuitry designed as described above. Many telephone systems have a service code beginning with 1 or 0 which are non-charge calls. In one preferred embodiment, therefore, means are provided for terminating the counting if the first digit is within a selected group, even though no coin is present. In another preferred embodiment, means are provided for determining the transmission of one of an initial class of digits, followed by a selected digit (usually a "1"), thus also being a combination in a call conventionally 'free' from a coin box. In the preferred form of the invention, the circuitry disconnects the counter, independent of coin absence on detection of this combination.

Figures 2, 3:
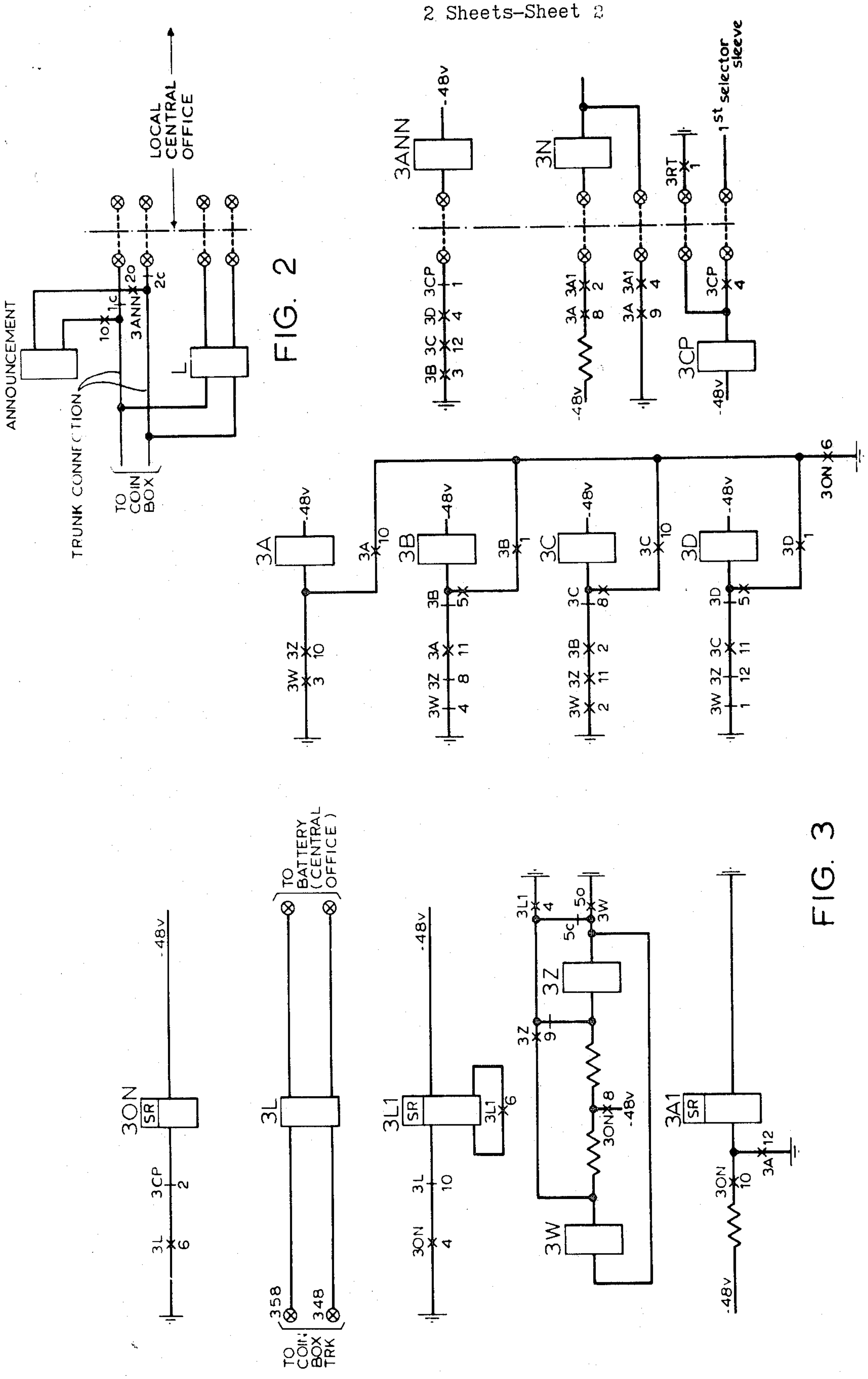

In drawings which illustrate a preferred embodiment of the invention:

FIG. 1 shows a circuit basically designed to terminate transmission of digits after a counter has counted a third dialled digit but where the counting will be terminated before the predetermined number of digits has been transmitted if:

1. a coin is present,
2. the first digit dialled is a '1' or a '0',
3. the first two digits are N1 where N is a selected number; and FIG. 2 shows the relationship of the coin box trunk to the circuitry of FIG. 1;

FIG. 3 shows a circuit basically designed to terminate transmission of digits after a counter has counted a fourth dialled digit but where the counting will be terminated before the predetermined number of digits has been transmitted if a coin is present.

In the drawings, the circuitry is as illustrated.

The relays are designated as blocks with letter designations. A set of contacts of a relay are not shown as connected thereto but rather are given the letter designation (say 'K') of the relay plus a number for the relay contacts, i.e. "K–1". Contacts open when the relay is de-energized (sometimes known as 'make' contacts) are indicated by an 'X' across the electrical line in which they act and contacts closed when the relay is de-energized (sometimes known as "break" contacts) are designated by a transverse line, across the line they affect.

The selector P or stepping switch, shown in FIG. 1, is a well known device and details of its construction need not be explained here. The selector P has two ganged arms and begins from the 'start' position, is stepped clockwise under the control of the stepping magnet, moving one step for each energization of the stepping magnet. The respective ganged arms make contact, successively with each of the numbered terminals from '1' upward during their stepping. The stepping switch is further designed so that energization of the release magnet causes the ganged selector arms to return to their initial 'start' position. The 'off normal spring contacts' shown in FIG. 1 as normally open or 'make' contacts, are, in accord with the conventional design of the stepping switch, closed when the stepping switch is moved from its initial position.

Certain of the relays are designed to take into account, the time between dial pulses, in transmission, and the normal time between the last pulse of one dialled digit and the first pulse of the next. In FIG. 1 and 3, the relays ON and 3ON are designed to have a delayed release time longer than the interval between interdigital pulses and longer than the normal interdigital pause. In FIGS. 1 and 3, the relay L1 and 3L1 are designed to have a delayed release time longer than the pause between pulses of the same digit, but shorter than the pause between digits.

Where two adjacent contacts, one open and one closed, in the deenergized state of the relay, are given the same number, the deenergized open one will be referred to with an '0' suffix and the deenergized closed one will be referred to with a 'C' suffix.

In FIG. 1, L is the pulsing relay for the circuit in accord with the invention, and is connected in a conventional manner to a battery source (not shown) in the central office and connected across terminals 23 and 33. When a coin station subset hook switch is operated, the circuit on the coin station side of relay L (that is across terminals 48 and 58) is closed and relay L is operated. Relay L operating opens contacts L–10 and prevents the operation of relay L1, at this time. Relay L operating, operates relay ON which is the relay effecting connection of and operation of the main circuitry in accord with the invention. Relay ON operating operates relay CT. Relay ON is provided with a sufficiently long release time to remain on during the interdigital pause and hence during the dialling interval.

When the coin box user dials the first digit the first pulse which as is well known appears as a circuit break between terminals 48 and 58, release relay L operating relay L1 over L–10. Once operated L1 will remain operated during the pulsing of a digit due to its slow release time (preferably 130 ms.). However, the release time of relay L is made short enough to allow it to release during the interdigital pause. Relay L1 is connected for fast operation and slow release by having one of its two windings connected in the circuit, as shown, and its other winding shorted across the normally open contacts L1–6 of the relay itself. The slow release time, designed into relay L1 is shorter than the interdigital pause, hence the opening of contacts L–10 for the period of the interdigital pause, causes the relay to release between the pulsing of digits. The relay however, does not release between successive pulses of the same digit.

The operation of relay L1 closes contacts L1–4 and with contacts ON–8 already closed, relay W operates.

The operation of relay L1 also closes contacts L1–8 to connect in the circuit, the stepping magnet which is designed and constructed to operate the arms P1 and P2 of the selector P, in accord with well known design principles, to step the arm around the contacts in accord with the break pulses received.

The stepping magnet operates the stepping switch arms from the start to the first position on release of relay L during the first break pulse, followed by the consequent operation of relay L1 closing contacts L1–8. L1 remains operated during the entire pulsing of the first digit but contacts L–10 open between each break pulse and close thereafter, to operate the selector arms to a position corresponding to the number of pulses in the first digit.

During the interdigital pause L remains operated for a sufficient time to release L1, opening contacts L1–4, and removing ground from one side of relay Z so that this relay operates.

Thus at the end of the pulsing of the first digit both relays W and Z are operated. With relay W and Z both operated, relay A is operated, locking over A–8 since ON–6 is closed. Operation of relay A operates relay N over A–2, CT–6 and on the other side over CT–10 and A–4. Operation of relay A closes contacts A–12, connecting ground to both sides of relay CT. Relay CT prepares itself to release but its release is retarded sufficiently, due to the design of the relay, to allow checking for the presence of a coin, before release of the relay. Closure of relay N operates a coin check circuit, not shown, but being designed in accord with one of a number of variants, all well known to those skilled in the art. The coin box circuit (in accord with the well known design, not shown) operates an RT relay (not shown) if a coin is present, but does not operate the RT relay if no coin is present.

In the alternative where a coin is present, the counting circuit will be no longer required. In accord with this, closure of contacts RT–1 of the RT relay forming art of the central office circuitry, operates relay CP. Relay CP locks over contacts CP–4 to ground embodied by the sleeve of the first selector (not shown) in the step-by-step central office. Operation of relay CP releases relay ON at contacts CP–2 and release of relay ON after the design release time, releases W, Z and A relays. The counter is effectively disconnected for the duration of the dialling interval, being held disconnected until ground is removed from the sleeve lead which occurs in accord with normal central office design, on disconnection of the sleeve lead when the calling party goes "on-hook".

In the alternative where a coin is not present, relay RT does not operate nor does CP relay operate. As previously stated, when relay A operated, it prepared the release of relay CT, 190–425 milliseconds later after the completion of the coin check. When CT releases, it releases relay N in the coin box trunk. During the dialling of the first digit, the alternate energization and de-energization of stepping magnet causes the selector arms P1 and P2 to step to the terminal corresponding to the number of pulses in the first digit. Movement of the selector arms from the start position, also effects closing of the off-normal springs to prepare for ground to the release magnet when relay ON releases. If the first digit was 1 or 0 (implying 1 or 10 break pulses) then relay CP is operated over contacts A–12 locking over CP–4 and disconnecting the counter and associated circuitry as previously described. Thus, in accord with this preferred facet of the invention, a call commencing with 1 or 0 is allowed to proceed without the use of a coin. Release of relay ON, in addition to its functions as previously described, energizes the release magnet of selector P on closure of the normally closed contacts ON–6C. Such release magnet, in accord with the well known design for a stepping switch, effects return of the ganged arms P1, P2 to their starting position.

If a coin is present or the first digit is a '1' or an '0' the call then proceeds as if the counter circuitry does not exist. If neither of these situations exist; then when the second digit is dialled relay L again follows the pulses. With the counter still connected, (coin not present and first digit not a 1 or an 0) relay L1, as before, is operated at the time of the first dial pulse and remains operated during the pulsing of the second digit. When relay L1 operates, it releases relay W by placing ground on both sides of the latter relay windings. At the end of the pulsing of the second digit, relay L1 releases, which releases relay Z.

Relays W and Z released and A operated, operates relay B which locks over contacts B–8o and ON–6. At the end of the third digit, relays W and Z are operated, as described in connection with the pulsing of the first digit). Relays W, Z and B operated, operate relay C, which locks over C–5o and ON–6. With no coin present, contacts CP–1 are closed and hence the closure of contacts C–2, on operation of relay C, operates relay ANN. Operation of relay ANN is used to accomplish two things; as schematically indicated in FIG. 2, to provide announcement or overflow tone over ANN–10 and ANN–20, to the calling party, and to break the trunk connection at ANN–1C, ANN–2C between coin subset and central office so that digits beyond the third may not be transmitted.

There may optionally be provided, a further mode of disconnecting the counter, when no coin is present, when the first two digits take the form N1 where N is one of a group of assigned numbers.

It will be noted that during the dialling of the initial digits, for a local call the selector arms P1 and P2, in response to the pulses through the stepping magnet, step off the pulses of the first digit. Unless, at this time, a circuit is connected for energization of the release magnet, the stepping arms remain in position and pulse the second digit and this process is repeated until the stepping switch has counted ten pulses. At this time the first arm, P1 at position 0, will operate relay SP, locking over SP–8 until the end of the dialling interval, and disconnecting, (also until the end of the dialling interval) the stepping magnet at SP–10.

However, in accord with the option to be described, when it is desired to disconnect the counter is response to the dialling of a plurality of digits; commencing with the digits "N1", (where N is a digit selected from a group of digits selected from 2–9 inclusive).

With such option the selected terminals for the selector arm P2 corresponding to the digits in the group, are connected to terminal 55 with terminals 51 to 54 corresponding to a first digit $N = 2 - 5$ respectively, and the terminals 41 to 44 corresponding to the digits $N = 6 - 9$ respectively. Supposing that one of the assigned numbers is '4', then terminal 53 is connected to terminal 55, and on dialling of an initial digit '4' relay L, as previously described, operates relay L1, relay L1 operates relay W and the pulses operate through relay L the step magnet and selector P so that arms 1 and 2 reach, at the end of the first digit, the position '4'. At the end of pulsing of the '4' relay L1 released:

a. operates relay Z
b. energizes the release magnet through the connection of terminal 53 to terminal 55, the off normal contacts being closed when the selector has moved from the start position. Energization of the release magnet returns the selector arms to the start position ready to operate in accord with pulsing of the second digit.

Relays W and Z operated, operate A relay which locks as before described. It is noted that relay A will operate after release of L1, hence the release magnet will be operated as above described before contacts A–8 open. Thus the selector is released by the release magnet to return to its original position. The opening of the off-normal spring de-energizes the release magnet.

At the end of the second digit the relay L1 releases, to ground arm P2 of selector P to operate relay CP if the wiper is in position '1'. (It is academic that this would also occur if the wiper was in position 0 since this would not occur in practice.) Relay CP operated, releases relay ON which releases relays A and B and energizes the release magnet of selector P. The counter is disconnected under control of the first selector sleeve.

It is noted that the selector will not release for the second digit if an unassigned digit is dialled but instead will pulse with further digits to position '0' but in any event will release on the release of relay ON at the end of the dialling interval.

The additional circuit thus discloses means for disconnecting the counter on the dialling of a sequence N1 where N is an assigned number.

It will be seen that this embodiment discloses circuitry whereby the circuit as described, in FIG. 1, provides a counter which, for local calls, in the absence of a coin, will prevent dialling past the third digit, and in which the counter may be disconnected after the pulsing of the first digit where the first digit is a '1' or a '0' or where a coin is present, or may be disconnected where the first two digits are a selected digit followed by a '1'.

It will be seen that, in this alternative, the use of the counter is avoided beyond the first digit when counting will not be required thus avoiding wear and maintenance for the counter.

The circuit, as above described, is released as follows:

when a calling subscriber goes 'on hook' relay L releases, releasing the slow release ON relay. Relay ON, on releasing, releases relays L1, A, B and C and the W and Z relays if operated. Release of the first selector sleeve resulting at central office in accord with conventional design, responsive to the "on-hook" condition, will release relay CP if operated.

There is also disclosed an embodiment of the invention wherein the dialling of any three digits is allowed, three digits are counted unless a coin is detected by test made after the dialling of the first digit and dialling of a digit beyond the third following a negative result on the coin check, results in the transmission of overflow tone to the calling party and disconnection of the calling party from the central office. Elements of FIG. 3, similar to those in FIG. 1 will be given the same designation as in FIG. 1 with a '3' affix.

As in the preceding embodiment, 3L is a pulsing relay for the circuit in accord with the invention and is connected in a conventional manner to a battery source (not shown) in the central office and connected across the coin box lines. When a coin station is connected in accord with this invention, the circuit on the coin station side (i.e. across terminal 348 and 358) is closed, and relay 3L is operated. Relay 3L operating opens contacts 3L–10 and prevents the operation of relay 3L1 at this time. Relay 3L operating, operates relay 3ON which is the relay effecting connection of and operation of the main circuitry in accord with the invention. Relay 3ON operating, operates relay 3A1.

When the coin box user dials a first digit, the first pulse releases relay 3L operating relay 3L1 over 3L–10. Once operated 3L1 will remain operated during the pulsing of a digit due to its slow release time (preferably 130 milliseconds). However, the release time of relay 3L1 is made short enough to allow it to release during the interdigital pause. Relay 3L1 is connected for fast operation and slow release by having one of its two windings connected in the circuit as shown, and its other winding shorted across the normally open contacts 3L1–6 of the relay itself.

The slow release, designed into relay 3L1 is shorter than the interdigital pause, hence the opening of contacts L–10 for the period of the interdigital pause, causes the relay to release between the pulsing of digits.

Relay 3ON is provided with a sufficiently long release time to remain on during the interdigital pause and hence during the dialling interval.

The operation of relay 3L1 closes contacts 3L1–4 and with contacts 3ON–8 already closed, the relay 3W operates.

During the interdigital pause following the dialling of the first digit relay 3L remains operated for a sufficient time to release 3L1 opening contacts 3L1–4 and removing ground from one side of relay 3Z so that this relay operates.

Thus at the end of the pulsing of the first digit both relays 3W and 3Z are operated. With relays 3W and 3Z both operated, relay 3A is operated, locking over contacts 3A–10 since contacts 3ON–6 are closed. Operation of relay 3A operates relay 3N over 3A–9, 8 and 3A1–4,2 since 3A1 is already operated. Operation of relay 3A closes contacts 3A–12 connecting ground to both sides of relay 3A1, which prepares itself to release but its release is retarded sufficiently due to the design of the relay to allow previous checking for the presence of a coin.

Closure of relay 3N operates the coin check circuit, not shown, but is designed in accord with one of a number of variants, all well known to those skilled in the art. The coin check circuit (in accord with the well known design, not shown) operates a 3RT relay (not shown) if a coin is present, but does not operate the 3RT relay if no coin is present.

In the alternative where a coin is present, the counting circuit will no longer be required. In accord with this, closure of contacts 3RT–1 of the 3RT relay operates relay 3CP. Relay 3CP locks over contacts 3CP–4 to the ground embodied by the sleeve of the first selector (not shown) in the step-by-step central office. Operation of relay 3CP releases relay 3ON, after the design relay, by opening contacts 3CP–2 and release of relay 3ON releases the 3W, 3Z and 3A relays. In this way the counter is effectively disconnected for the duration of the dialling interval, being held disconnected until ground is removed from the first selector sleeve lead which occurs, in accord with the normal central office design, when the calling party goes "on-hook".

In the alternative where a coin is not present, relay 3RT does not operate nor does the 3CP relay operate. As previously stated, when relay 3A operated it prepared the release of relay 3A1, 190 to 425 milliseconds later and after the completion of the coin check. When relay 3A1 releases, it releases relay 3N in the coin box trunk.

When the second digit is then dialled relay 3L follows the pulses. Relay 3L1 as before, is operated at the time of the first dial pulse and remains operating during the pulsing of the second digit. When relay 3L1 operates, it releases relay 3W by placing ground on both sides of the latter relay windings. At the end of the pulsing of the second digit, relay 3L releases which releases relay 3Z.

Relays 3W and 3Z released and 3A operated, operates relay 3B which locks over contacts 3B – 5 + 3B1. At the end of the third digit relays 3W and 3Z are operated, as described in connection with the pulsing of the first digit. Relays 3W, 3Z and 3B operated, operate the 3C relay which locks. At the end of pulsing the fourth digit relays 3W and 3Z are released as described in connection with the pulsing of the second digit. Relays 3W and 3Z released and relay 3C operated operates relay 3D. Relays 3B, 3C and 3D operated and relay 3CP released (since a coin was not present) operate the 3ANN relay which in accord with means not shown but well known to those skilled in the art (indicated schematically in FIG. 4) opens through contacts of relay 3ANN the connection between the coin operated subset and central office, and through contacts of relay 3ANN, connects a source of overflow tone or an announcement to be heard by the calling party and disconnects the subscriber from the central office. The circuitry for operation by the contacts of relay 3ANN is not shown as its operation and arrangement is exactly the same as in FIG. 2, and the ANN relay contacts there shown operate as the 3ANN contacts here under discussion.

The circuitry as above described, is released, as follows:

When the calling subscriber goes on-hook, relay 3L releases which releases the slow release 3ON relay. Relay 3ON, on releasing, releases relays 3L1, 3A, 3B and 3C relays, and 3W and 3Z relays if operated. The release of (i.e. removal of ground from) the first selector consequent on the calling party going on-hook, will release the CP if operated.

The embodiments of the invention in which an exclusive property or privilege is claimed are defined as follows:

1. Method allowing free dialling of a predetermined number of digits from a coin operated telephone subset, where said predetermined number is less than the number of digits required to place a local call from said subset, comprising the steps of:

contingently counting the digits dialled at said subset up to said predetermined number;

determining before the dialling of said predetermined number of digits, whether or not a coin has been deposited;

in the event that a coin has been deposited, terminating said counting;

with unterminated counting of the number, preventing the transmission of dial pulses representative of digits above said predetermined number.

2. A method as claimed in claim 1 wherein the determination of whether or not a coin has been deposited is made after the dialling of said first digit.

3. A method as claimed in claim 1 wherein the determination is made as to whether the first digit dialled is one of a predetermined group of digits and if so terminating said counting.

4. A method as claimed in claim 2 wherein the determination is made as to whether the first digit dialled is one of a predetermined group of digits and if so terminating said counting.

5. A method as claimed in claim 3 wherein counting is terminated if the first digit is a 1 or a 0.

6. A method as claimed in claim 1 combined with the steps of determining whether the first digit dialled is one of a selected number followed by a 1 and on determining this matter positively, terminating said counting.

7. A method as claimed in claim 2 combined with the steps of determining whether the first digit dialled is one of a selected number followed by a 1 and on determining this matter positively, terminating said counting.

8. Means allowing for free dialling of a predetermined number of digits from a coin operated telephone subset, where said predetermined number is less than the number of digits required to place a local call from said subset, comprising:

means connected to detect the signals dialled at said subset, responsive to the dialling of digits at said subset for contingently counting the digits dialled at said subset up to said predetermined number;

means responsive to the dialling of digits at said subset for determining, whether or not a coin has been deposited.

means, responsive to the determination that a coin has been deposited, for causing the termination of counting by said counting means;

means, responsive to the unterminated counting by said counter of said predetermined number of said digits, for preventing the transmission of pulses representative of dialled digits above said predetermined number.

9. Means as claimed in claim 8 wherein said means for determining whether or not a coin has been deposited; is connected and designed to make such determination after the first digit has been dialled.

10. Means as claimed in claim 8 in combination with means for determining whether or not the first digit dialled is one of a predetermined group of digits, and connected and designed, on making said determination positively, to cause the termination of counting by said counting means.

11. Means as claimed in claim 9 in combination with means for determining whether or not the first digit dialled is one of a predetermined group of digits, and connected and designed, on making said determination positively, to cause the termination of counting by said counting means.

12. Means as claimed in claim 10 wherein said means for making a determination as to the first digit, is designed and constructed to cause the termination of counting if the first digit is a 1 or a 0.

13. A means as claimed in claim 8 in combination with means for determining whether or not the first digit is one of a predetermined group of digits and whether the second digit is a '1', and designed and constructed to cause termination of counting if the determinations show that the first digit is one of said predetermined group and the second digit is a '1'.

14. A means as claimed in claim 9 in combination with means for determining whether or not the first digit is one of a predetermined group of digits and whether the second digit is a '1', and designed and constructed to cause termination of counting if the determinations show that the first digit is one of said predetermined group and the second digit is a '1'.

* * * * *